United States Patent [19]
Mitchell

[11] 3,982,825
[45] Sept. 28, 1976

[54] COLOR FILTER HEAD FOR PHOTOGRAPHIC ENLARGERS

[75] Inventor: Robert W. Mitchell, St. Joseph, Mich.

[73] Assignee: Photo Systems, Inc., Dexter, Mich.

[22] Filed: Oct. 15, 1974

[21] Appl. No.: 514,632

[52] U.S. Cl. .................................. 350/313; 353/84; 355/35; 355/71
[51] Int. Cl.² ...................... G03B 27/76; G02B 5/20
[58] Field of Search .......................... 350/313–316, 350/318; 355/35, 71; 353/84; 354/102; 352/42, 45, 213; 356/188–190

[56] References Cited
UNITED STATES PATENTS

| | | | |
|---|---|---|---|
| 2,049,556 | 8/1936 | Chapman et al. | 355/35 |
| 2,060,503 | 11/1936 | Killman et al. | 352/42 |
| 2,228,479 | 1/1941 | O'Grady | 350/313 |
| 3,366,006 | 1/1968 | Saila | 353/84 |
| 3,885,859 | 5/1975 | Dalgleish et al. | 350/96 C |

FOREIGN PATENTS OR APPLICATIONS

| | | | |
|---|---|---|---|
| 927,189 | 5/1955 | Germany | 355/35 |
| 611,883 | 10/1960 | Italy | 350/315 |
| 905,675 | 9/1962 | United Kingdom | 350/313 |

*Primary Examiner*—Ronald J. Stern
*Attorney, Agent, or Firm*—Neuman, Williams, Anderson & Olson

[57] ABSTRACT

A color filter head for attachment to photographic enlargers has a universal mount adapted for ready attachment to lens mounts regardless of size and a unique system for sequential color addition and integration to produce a color corrected print. The filter head includes a manually rotatable, adjustable filter disc assembly having high-density filter segments which are relatively movable under an overlying cover disc having two opposed open quadrants. The filter assembly acts like a balanced fly wheel which is mounted beneath the enlarger lens. In normal use, the light from the lens passes through the open quadrants of the cover disc and through the portion of the filter material disposed in the open quadrants as the wheel is manually rotated during the printing step. The system thereby utilizes a method of sequential light addition and integration. Sequential periods of white and colored light are integrated to produce the desired total exposure. By proper filter disposition beneath the lens during exposure, desired color balance is obtained in the finished color print. The periphery of the cover disc has calibrations thereon whereby the desired degree of effective color density is readily and accurately achieved by mere tab movement.

20 Claims, 12 Drawing Figures

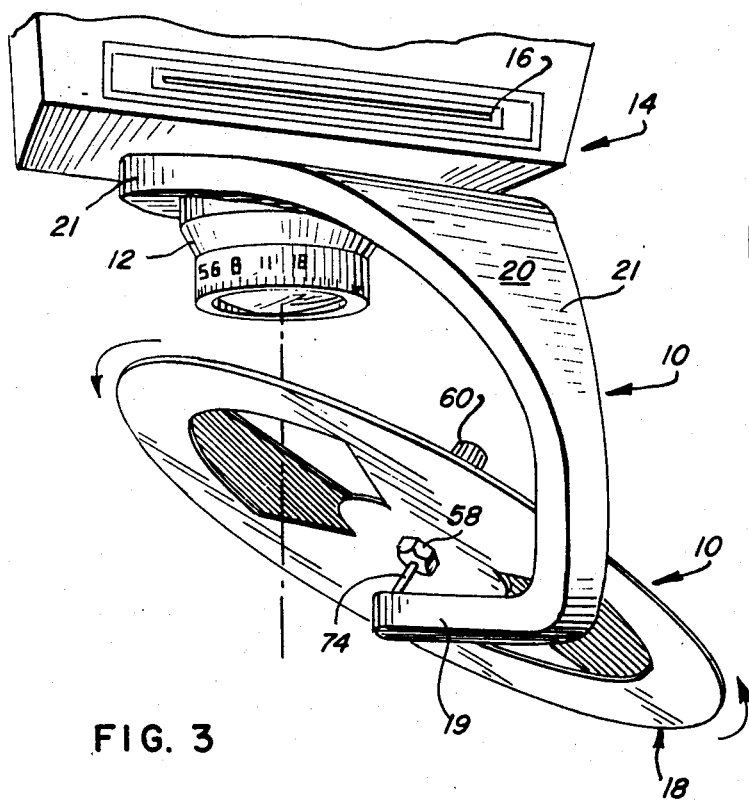
FIG. 3
FIG. 4
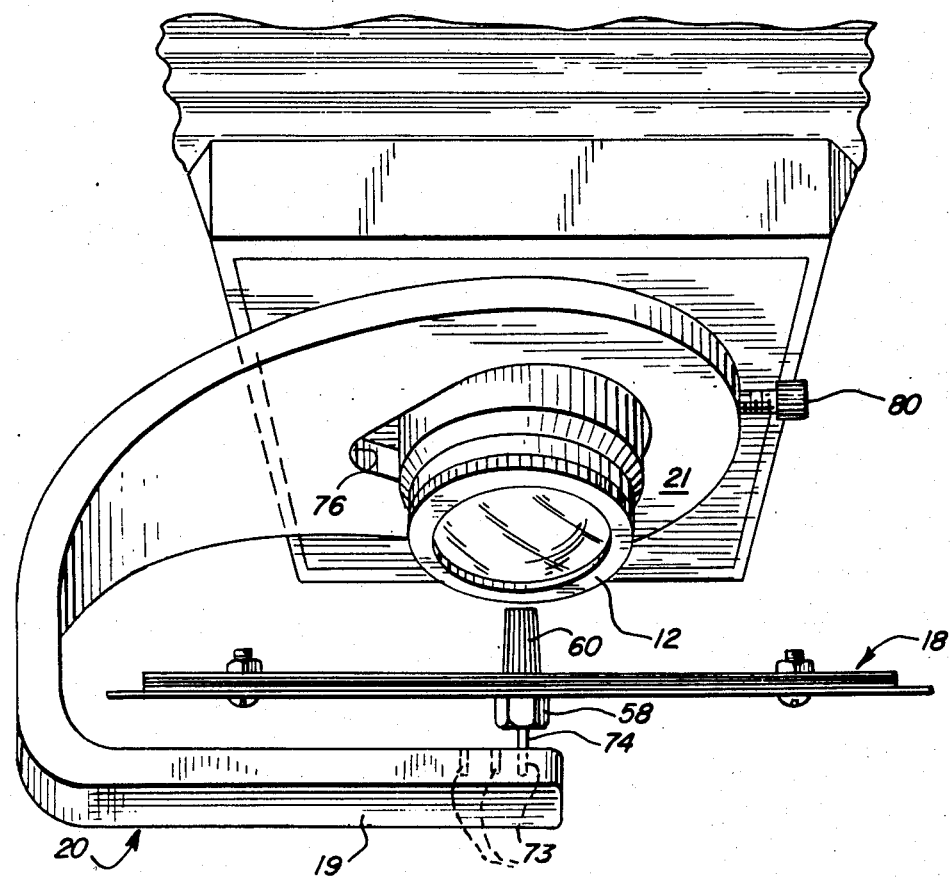
FIG. 5

COLOR FILTER HEAD FOR PHOTOGRAPHIC ENLARGERS

FIELD OF THE INVENTION

This invention relates to a color filter head adapted to be readily mounted on the lens holder of a photographic enlarger and a method of sequential color addition and integration. The filter head employs one or more adjustable filter discs which are manually rotatable in the path of light passing between an enlarger lens and a sheet of light sensitive photographic print paper for purposes of obtaining desired color balance in a resulting color print.

BACKGROUND OF THE INVENTION

In order to obtain desired color balance in color printing, a number of variables must be considered. Color printing paper which normally contains three emulsion layers sensitive to blue, green and red light (or their complements) varies with the specific manufacturing technique employed in producing the same, and with age. Other color variables result from improper film exposure, the developing process and the lens of the camera employed. The so-called white light used in printing may also vary in the composition of primary colors therein. The artist may also wish to create a particular impression such as a sense of warmth or coolness through the use of color balance. In addition, film manufacturers often employ an overall color or "mask", usually an orange cast, to take advantage of the optimum characteristics of the various dyes employed in the film and paper.

In the course of typical color printing a test print is first made to enable compensation for the aforementioned variables, and compensating filters are employed to eliminate the variables to the extent that a print having the desired color balance is obtained.

A method of readily determining the appropriate filter compensation to provide optimum color balance in the course of printing is disclosed in my U.S. Pat. No. 3,443,868.

While red, green and blue filters may be employed for color compensation, it is normally preferred to employ magenta, cyan and yellow filters since each of these absorbs a single primary color (green, red and blue respectively) and they are simpler to use. Thus, in controlling the ratio of green, red and blue light employed in the printing step, filters of suitable densities must be employed.

Among the various types of color filters are acetate filters or "color printing" or "cp" filters which are only placed between the light source and the negative since they are not optically clear. Still another type of filter are the gelatin filters, commonly referred to as "color correction" or "cc" filters which are placed either in the tray between the light source and the lens or beneath the lens. Also special lamp housings are available in some enlargers which provide a continuous adjustment in the transmitted light by the use of narrow band or dichroic filters or other "built-in" capabilities.

The correction filters must be kept scrupulously clean to work properly and are available in a wide range of graduated densities. The special lamp housings or color heads for enlargers permit continuous adjustment of the three colors from zero to 1.20 density. Such color heads, however, are generally quite expensive.

In accordance with this invention a unique method of sequential color addition and integration uses a variable color filter head comprising a cover disc divided into four 90° segments or quadrantal sectors. The filter head is mounted for rotation beneath the enlarger lens. Two of the segments are opaque and two are cut out or transparent to form effectively apertured portions. Rotatable movable into the cut-out segments are opposed segments of high density filter material which are opposed sectors and can be called a "butterfly" configuration. A plurality of filters of different color may be stacked beneath the cover disc whereby each may rotate into the cut-out portions but also may be completely concealed beneath the cover segments. They are carried by a carrier comprising at least a periferal annulus and central hub of relatively rigid material. Assuming no filter material is disposed in the cut-out disc openings, one hundred percent of the raw white light is transmitted in an unaltered state with zero color correction when one of the open segments is aligned with the enlarger lens and no light is transmitted when an opaque segment is disposed under the lens. Thus when the head is rotated the integrated, light value is white and 50% of the unaltered total quanta over any given time interval reaches the underlying easel, if the interval is relatively long compared to the period of one filter head rotation.

Assuming it is desired to filter out blue light emanating from the enlarger lens to obtain desired color balance in the underlying paper being exposed, a yellow filter is rotated to fill a portion of the cut outs of the cover disc. A tab connected to the disc on which the opposed segments of the yellow filter are mounted is manually engaged to rotate desired portions of the yellow filter segments into the cover disc cut outs. An indicator mark on the tab will move relative to a scale on the cover disc annulus bordering the cut-out segments indicating the effective density of the filter material for the particular angular portions disposed in the cover disc cut outs or open quadrants.

The filter head may be readily secured in operative position on an enlarger lens by means of a universal mount construction or support hereinafter described in detail. The mount is yoke-like and has one leg supporting the filter assembly and the other secured to the lens mounting. In the course of printing, the filter disc assembly is initially rotated by hand on a low-friction needle bearing in the path or axis of the generally collinated light. The head will continue to spin on the bearing under the forces of inertia. The weight and weight distribution determine the total time of rotation but a time of three minutes or more is obtainable. Since color exposures can exceed 30 seconds and or even in duration, the spinning disc assembly produces an average integrated coloration in the light in accordance with the setting of the filter material. Because of the prolonged exposure, there is no degradation in the print resulting from the sequential exposure or the varying speed in the disc rotation. Even respinning during exposure causes no perceptible effect on the print.

It is an object of this invention to provide an improved method of color control in photographic exposure including the sequential addition and integration of a plurality of light quanta.

It is another object of this invention, to provide a color filter disc assembly which readily attaches to an enlarger lens holder for providing variable color correction and practicing the improved method.

It is another object of this invention to provide a variable color filter assembly which may be readily and inexpensively formed of readily available materials and which may readily be put in use with substantially all enlarger constructions presently in the field.

It is a further object of this invention to provide a color filter assembly which may be readily, manually adjusted to provide a desired degree of filter hue and density whereafter the assembly is easily, manually rotated in the course of the printing step.

The above and other objects of this invention will become more apparent from the following detailed description when read in the light of the appended claims and accompanying drawings in which:

FIG. 3 is a perspective view of a color filter assembly made in accordance with this invention disposed on a universal mount attached to an enlarger lens and illustrating the filter assembly in a normal angular position of use;

FIG. 4 is a fragmentary plan view of the base of the mount illustrated in FIG. 3; and FIG. 5 is a perspective view of the embodiment of FIG. 3, slightly enlarged, looking upwardly at the lens housing of the enlarger and illustrating the color filter head arranged in the horizontal plane.

DESCRIPTION OF THE INVENTION

For a more complete understanding of this invention, reference will now be made to FIG. 3 illustrating a filter head 10 made in accordance with this invention attached to the lens 12 of an enlarger 14 fragmentarily illustrated. The enlarger is of a type well known in the art being adjustable in the vertical plane on a supporting upright for focusing purposes, and having an internal light source located above a negative tray which may receive a film strip threaded transversely through slot 16 of the enlarger beneath the light source. The light from the lens is normally focused on an underlying easel on which the print paper is positioned.

Figure 1:
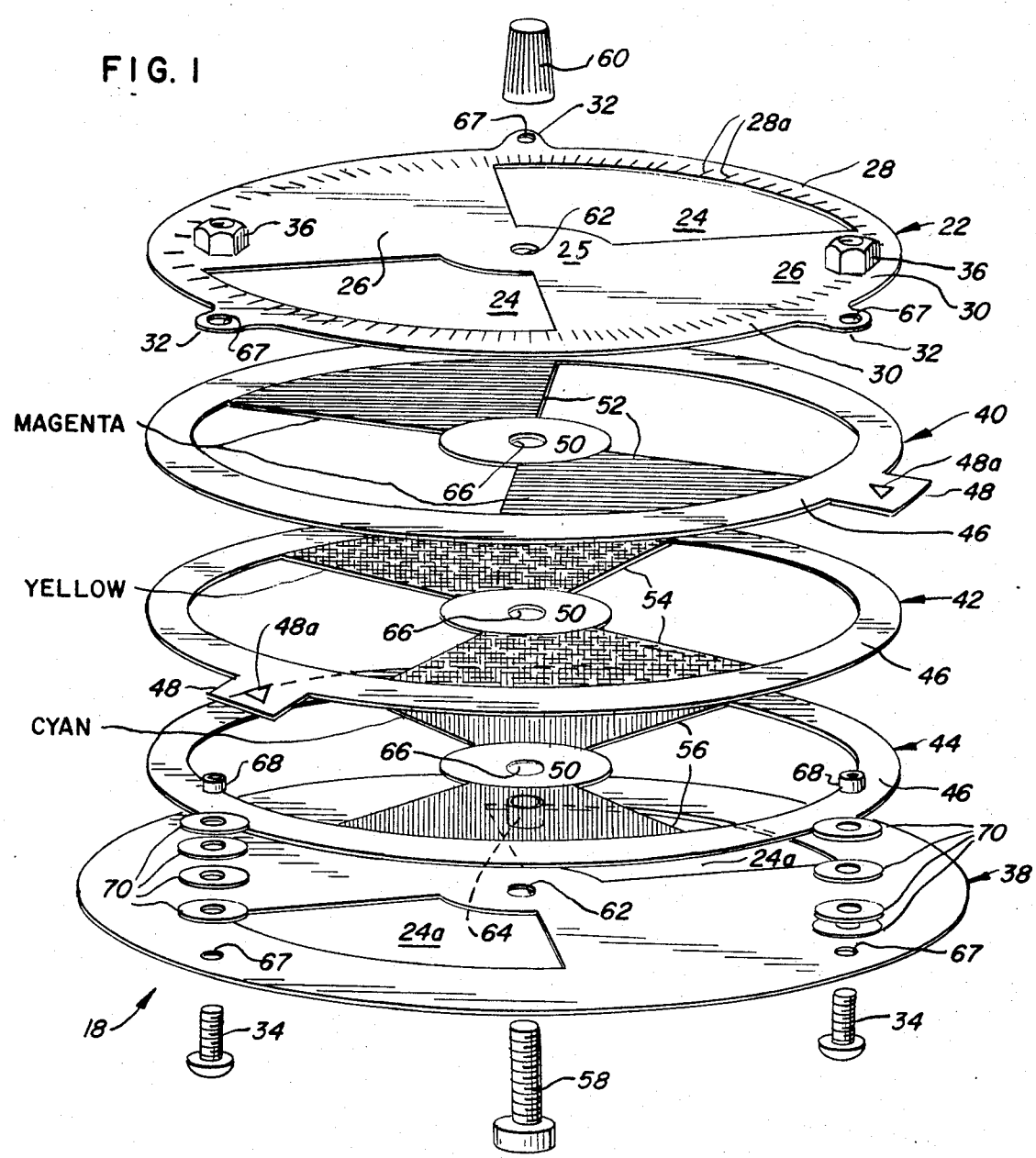
FIG. 1 is an exploded view of one embodiment of a color filter assembly made in accordance with this invention.

It will be noted from FIG. 3 that filter head 10 comprises the two main components, namely, a disc assembly 18 illustrated in detail in FIG. 1 and universal clamp 20 illustrated in FIG. 4. Clamp 20 serves as a mount for the rotatable disc assembly and as an attachment means for securing the assembly to the enlarger lens 12.

Disc assembly 18 (see FIG. 1) comprises a cover disc 22 having opposed quadrant cut-out portions 24 and solid quadrants 26 connected together through inner annulus 25 and outer annulus 30. Peripherally arranged about the quadrants on outer annulus 30 are three series of indicia located between apertured mounting lugs 32 spaced 120° apart. The indicia between two adjacent lugs is calibrated to cooperate with a filter tab to indicate the color composition. Lugs 32 are traversed by bolts 34 which engage nuts 36 and entrap various discs and washers for purposes of maintaining the various elements of FIG. 1 in a state of assembly as illustrated in FIGS. 2, 3 and 5.

A generally planar bottom disc or base 38 having open quadrants 24a arranged beneath quadrants 24 in the normal assembled position, has a diameter larger than cover disc 22 and has apertures 67 which align with apertures 67 in lugs 32. Sandwiched between the bottom and cover discs are filter discs 40, 42 and 44. Each of the latter discs has a solid annular periphery 46 which may be of sheet metal for improved inertia and which has an integral actuating tab 48. A center hub 50 of each disc 40, 42 and 44 is maintained in spaced relation with annulus 46 by means of filter media segments 52, 54 and 56 adhesively or otherwise secured along opposed arcuate edges to the connected center hub 50 and annulus 46. The tabs 48 facilitate manipulation of the filter discs 40, 42 and 44 and also have an arrow 48a or similar indicia to cooperate with the scale workings 28a for setting each filter disc. In a preferred embodiment the three 120° segments of cover rim 28 are colored magenta, yellow and cyan to indicate the tab 48 for each filter disc. For greater filter disc rigidity thin metal ribs (not illustrated) may extend between the hub 50 and annulus 46 along one radial edge of each filter media segment.

Magenta filter segments 52 of disc 40, yellow filter segments 54 of disc 42 and cyan filter segments 56 of disc 44 are of high density filter media. In a typical embodiment, all the media used had effective densities of about 1.50 or more. Center bolt 58 traverses the central apertures in the cover and bottom discs as well as the filter discs of FIG. 1 so as to maintain the discs in a state of assembly when a lock nut 60 is secured on bolt 58 as illustrated in FIG. 2. In the normal course of disc assembly bolt 58 is located in central aperture 62 of bottom disc 38, and bushing 64 is centered thereon so as to rest on the disc 38 as illustrated in FIG. 2. The nut 60 is preferably knurled and shaped to facilitate manual engagement for rotation of the entire assembly. Hub apertures 66 of filter discs 40, 42 and 44 are larger than apertures 62 in the bottom and cover discs 22 and 38 whereby a bushing 64 may surround bolt 58, traverse the filter discs and be clamped between the undersurface portion of cover disc 22 and the upper surface of bottom 38. Bushing 64 thus spaces the cover disc 22 from the bottom disc 38 providing an interval in which filter discs 42, 44 and 46 may rotate about bolt 58. Assembly bolts 34 pass through apertures 67 in bottom disc 38 and in cover disc lugs 32. Spacers 68 are received on the shanks of bolts 34 and abut the bottom and cover discs to provide an interval between the cover and bottom discs within which the filter discs may rotate. Spacers 68 and bushings 64 should be of substantially the same height.

Figure 2:
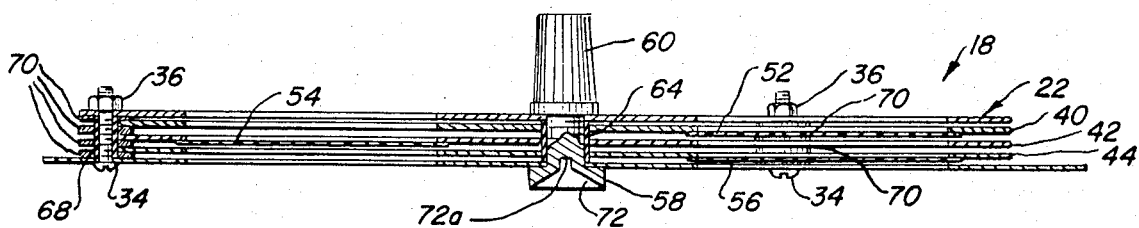
FIG. 2 is a transverse sectional view partly in elevation of the filter assembly components of FIG. 1 in assembled relation.

As noted from FIG. 2 the outer peripheries of the filter discs are located adjacent but within the peripheries of bushings 68 so as to rotate without engaging the same. Functioning as an inter-filter disc spacer is a felt washer 70 mounted about each bushing 68. The portion of the annulus of each washer 70 extending inwardly from the innermost portion of the bushings 68 will thus function as a spacer between the filter discs and also perform a braking or friction function by preventing free rotation of filter discs in the absence of manual actuation of the discs by tabs 48. The ease of rotation of the filter discs may be regulated by the thickness of the felt spacers 70 relative to spacers 68.

The center bolt 58 has a conic recess 72 with a small cylindrical center 72a (see FIG. 2) enabling the disc assembly 18 to be rotatably mounted on a needle bearing 74 of mount 20 as illustrated in FIGS. 3 and 5.

The assembly 10 is readily mounted about an enlarger lens such as lens 12 of enlarger 14 illustrated in FIGS. 3 and 5, by a simple screw-extending action. It will be seen from FIG. 4 that mount 20 has a top portion or leg 21 provided with an opening 76 defined by opposed semi-circular edge portions 75 and 77 connected by converging straight tangent side wall portions 78. The diameter of semi-circular portion 75 must be at least as great as the outer diameter of the largest lens to be accommodated. Conversely, the diameter of semi-circular portion 77 must be at least as small as the diameter of the smallest lens to be accommodated to provide the desired three point mounting. The opening 76 may thus receive lenses of varying diameter. Each lens effect point contacts where engaging the two converging walls, as does illustrated lens 12, and a third point contact where engaged by a locking screw 80 which is preferably formed of plastic and threaded into base 21. The mount may thus engage any lens small enough to enter the aperture 76. The screw 80 may be longer than illustrated to engage any lens touching opposed walls 78.

Needle bearing 74 may be positioned in any of a plurality of sockets 73 disposed along the length of bottom leg 19 of mount 20 whereby the peripheries of the filter discs may be desirably located relative to lens 12 of the enlarger as illustrated in FIG. 3. The position of the center of the lens 12 relative to the location of pin 74 is dependent upon lens diameter. In general the radial length of the filter segments 40, 42 and 44 will be adequate to accommodate the full range of lens diameters. However, for optimum centering of the filter under the lens, a change of position of pin 74 into another socket 73 may be desired. Also, the plurality of sockets may be replaced by a slot and in that event infinite adjustability of the needle is obtained. A bottom head and threaded nut can be employed on the needle to maintain the desired location. FIG. 3 also illustrates the angular position of the filter assembly 18 relative to the lens axis. The plane of the filter assembly preferably forms an angle of 65° to 75° to the axis of light passage from the lens for close positioning of the periphery of the disc assembly to the lens 12 and easy manual access to the manually engageable nut 60. The needle bearing 74 is preferably mounted at an angle to the leg 19 of mount 20. Preferably the leg 19 will also actually have the desired angle relative to the lens axis.

Generally, the cylindrical portion 72a of the recess 72 will be adequate to maintain the needle and disc assembly at the desired angle.

If the filter media segments 52, 54, and 56 of the filter discs 40, 42 and 44 respectively are disposed beneath the metal mask quadrants 26 of the cover disc 22, 50 percent of the raw white light passing from the lens 12 will be transmitted through the disc assembly 18 if the same is rotated during a printing operation, and no color correction will, of course, be imparted by the masked filter discs.

As above noted, the large number of variables in color printing such as the variances in the printing paper, so-called while light, color film, camera lens and the enlarger necessitate the use of filter compensation if desired color balance is to be obtained in the color prints. In my U.S. Pat. No. 3,443,868 a method and apparatus are disclosed whereby color balance in color photographic printing is computed. In the absence of such determination filter media arranged in densities which increase in regular increments are employed for arriving at the proper filter correction and filter density needed to provide the desired color balance. Color balance in color printing may also be computed by employing the colorimeter disclosed in my U.S. Pat. No. 3,690,763.

Assuming, therefore, that the desired filter media of specific density has been ascertained for purposes of providing the desired color balance in a color print product, the filter head of this invention is ready for use.

One or two of the color discs may be rotated whereby the filter media segments are moved into the cover disc open quadrants 24 by rotating the same about the center bolt 58. Assuming a color correction has been computed requiring a 0.30 density yellow filter, the yellow filter disc 42 is rotated by its tab 48 until the indicator arrow 48a thereon is lined up opposite the 0.30 density marking on the cover disc annulus for the yellow filter. In all cases, compensation could be obtained with any two of three complementary colors. Because most corrections involve the addition of yellow and magenta, use of these two are preferred. Cyan correction can then be obtained by the addition of more white light and the decrease of magenta and yellow filtering. This provides an effective increase of cyan. The inclusion of three independent filter discs simplifies the set-up determinations and procedures. While the calibration of the scales 28 may be done mathematically, it has been found best to empirically calibrate a particular design based upon actual tests.

The disc 42 may be readily calibrated for the degrees of density between zero (when completely masked by the cover disc) and maximum density (when fully disposed in the quadrants 24) by measuring the color densities of the various adjustments with a photometer. Such calibration does not, however, produce regularly spaced percentile indicia on the cover disc annulus 28, since the indicia are non-linear and compress on the high density end of the scale. However, since the filters are normally employed with the low end of the density scale, precise filter densities are obtained in the normal course of use.

The actuating tabs 48 of the three filter discs will engage the two bolts 34 to define the end limits of the disc rotational movement at zero and optimum density readings on the annulus scale; the bolts 34 thus function as stops limiting the rotating of the filter discs, each bolt acting as a stop for two tabs 48 approaching from opposite directions.

After the appropriate filter setting has been made, the filter disc assembly is spun by hand on the needle bearing 74 by manually engaging and spinning the knurled nut 60, then the printing is begun. The disc assembly is preferably placed as close as possible to the lens 12 to minimize distortion and allow the disc assembly to be of a minimum diameter. If the color correction requires subtraction of two colors, two of the filter discs may be employed simultaneously with their filter media segments in overlapping relation.

A constant exposure time may be obtained regardless of the color correction being provided by the filter head 10 if a suitable neutral density filter material is employed adjacent the opposed filter media segments of each filter disc 40, 42 and 44 in the open color disc quadrants. Thus a constant amount of light would be eliminated by the disc assembly 18 regardless of the specific filter settings. Again the disadvantage of such an arrangement is higher light loss at all fiter settings.

Since the color disc annuluses and hubs may be formed of sheet metal, as may the cover and bottom discs, the assembly 18 functions as a fly wheel and rotates for as long as three minutes from a single finger-induced spin. The angular disposition of the disc assembly and knurled nut 60 facilitates manual engaging thereof in the course of use and obviates passing the actuating hand in the path of the light passing from the lens 12.

The filter settings may obviously be substantially instantaneously changed to provide any of an infinite number of color printing corrections. Luminous markings may be disposed on the knurled nut 60, color disc tabs 48 and cover disc annulus 28 to facilitate darkroom use.

If desired it is also possible to arrange red, blue and green sectors to completely fill a disc so that some reduction in light always results but the decrease in any one exposed filter color, such as blue, will result in a proportionally equal increase in the other two, namely green and red.

FIGS. 6 through 11 are illustrative of filter assemblies employing such discs. It will be more clearly seen from FIGS. 6 and 10 that disc 82 is composed or red filter segments 84, blue filter segments 86 and green filter segments 88. The individual filters are arranged in contiguous 30° segments. Each color is arranged in one pair of segments directly opposed to each other; counterclockwise of the filter segments of each pair are filter segments of the other two colors. The three pairs of opposed segments are arranged 30° apart as illustrated. It will be seen from FIGS. 6 and 10 that the two opposed red segments 84 have arranged counterclockwise to the upper red segment 84, a blue segment 86 and counterclockwise to the directly opposed lower red segment 84 a green segment 88. A similar relative color arrangement is present with respect to the opposed blue segments 86 and green filter segments 88, each pair of the blue and green segments having arranged counterclockwise thereof segments of the other two colors.

Figure 10:
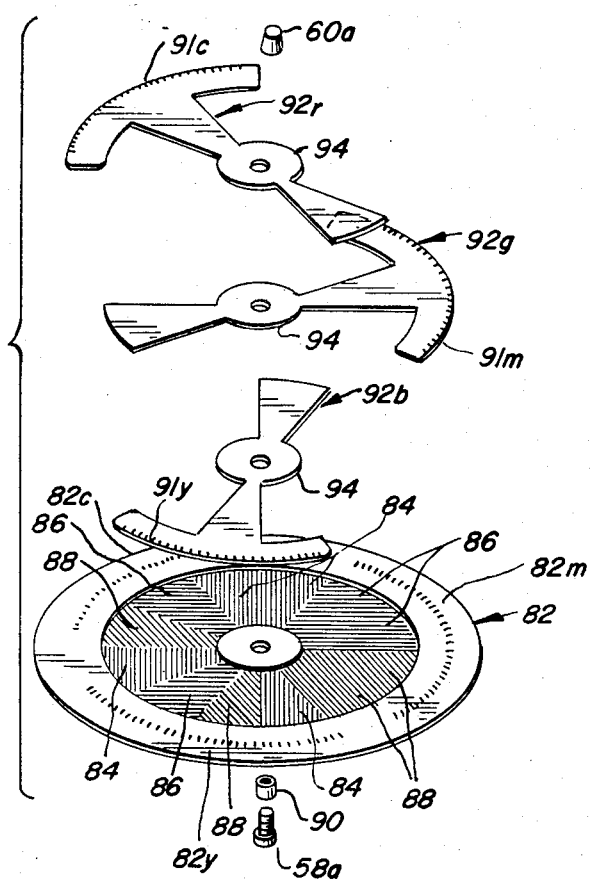
FIG. 10 is an exploded view of the components employed in the modified color filter assembly of FIG. 6.

Pivotally mounted at the center of the disc 82 about bushing 90 and center bolt 58a having a structure similar to bolt 58 of FIGS. 1 and 2, are three propeller-like covers 92r, 92b and 92g, most clearly seen in FIG. 10. Each cover moves clockwise 30° to cover the opposed color segments indicated by its respective subscript $r$ (red), $b$ (blue) or $g$ (green). Each cover has an apertured central hub portion 94 for passage of bolt 58a having a central shank portion surrounded by bushing 90 and a terminal portion which threadedly engages knurled nut 60a employed for spinning the entire assembly in the manner previously described with respect to assembly 18.

Thus cover 92 upon moving clockwise covers the opposed red segments 84 while simultaneously uncovering equal parts of segments of the two colors blue and green disposed counterclockwise of the segments 84. When full adjustment has been made, neither red filter segment of the opposed segments is operable on the disc 82, and simultaneously an equal amount of minus red filter elements replaces it on the disc which define cyan or blue-green.

Such arrangement may be made substantially linear if ideal filter elements are employed. Thus by use of cover 92r not only is red removed but its complement cyan composed of blue and green replaces it on the disc 82.

Covers 92b and 92g function similarly. As cover 92g is moved clockwise, portions of the opposed discs 88 are covered while simultaneously equal amounts of minus green or blue-red magenta become functional on the disc 82.

As cover 92b is moved clockwise the opposed blue segments 86 are progressively covered and segments of red and green are progressively uncovered which are minus blue or yellow.

Indicia may be disposed at 82c, 82m and 82y about the outer periphery of disc 82 and indicia 91c, 91m and 91y disposed on the curved portions of covers 80r, 80g and 80b, the latter defining vernier scales for calibrating the effectively exposed filters on disc 82 in values of minus red, minus blue and minus green or in terms of cyan, yellow and magenta. Thus a single light source may be employed in a single exposure to effect a desired color correction which is first calibrated prior to disc use.

Figure 6:
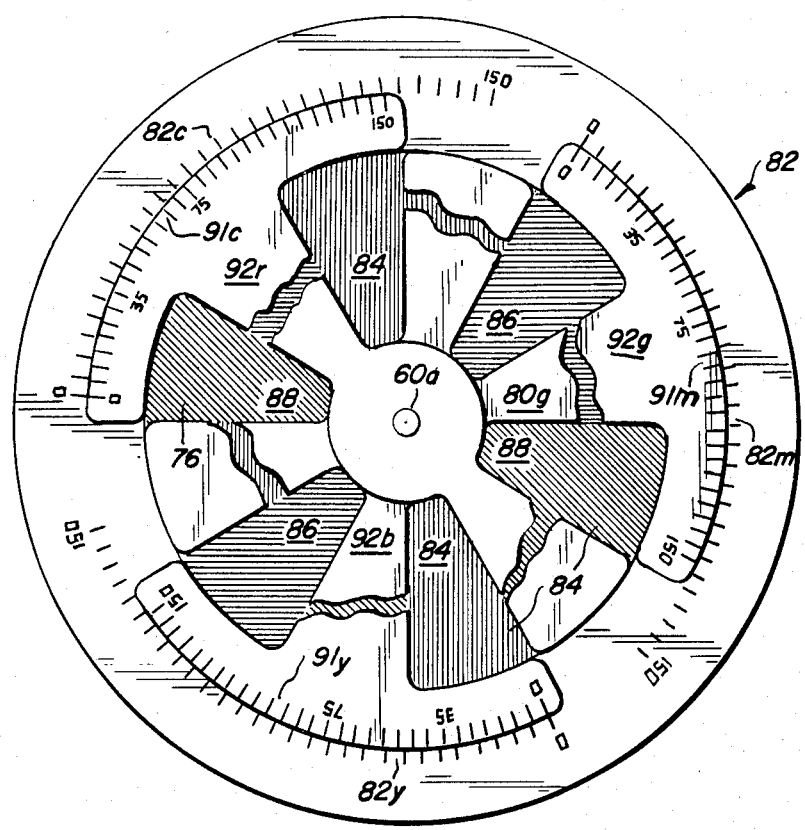
FIG. 6 is a plan view of a modified color filter assembly made in accordance with this invention having cover members thereof broken away.
Figure 9:
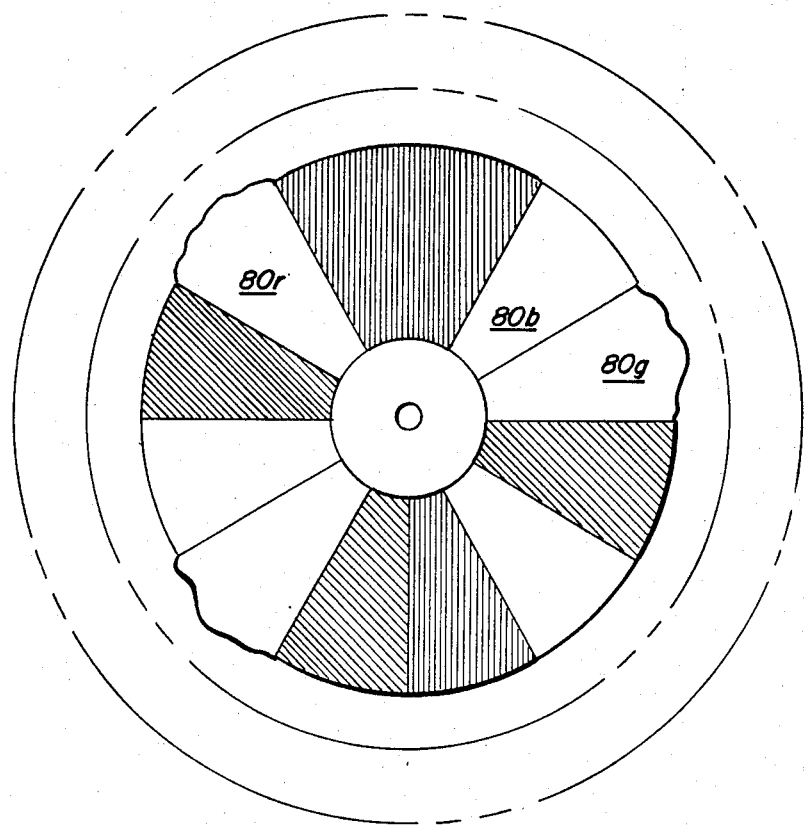
FIG. 9 is a plan view of a color disc having a plurality of movable covers arranged thereon so as to provide for the presence of maximum yellow and the absence of blue in light passing therethrough.

The desired color correction may thus be readily dialed utilizing the discs of FIGS. 6 and 10. FIG. 9 is illustrative of a color correction requiring the absence of the blue filter segments on the disc or the presence of maximum yellow. The discs 80b are arranged to mask out the opposed blue filter segments providing a maximum yellow reading on the vernier attached to cover 80b while the remaining covers 80r and 80g are in the "neutral" positions covering opposed dissimilar pairs of blue and green and red and blue respectively.

Figure 7:
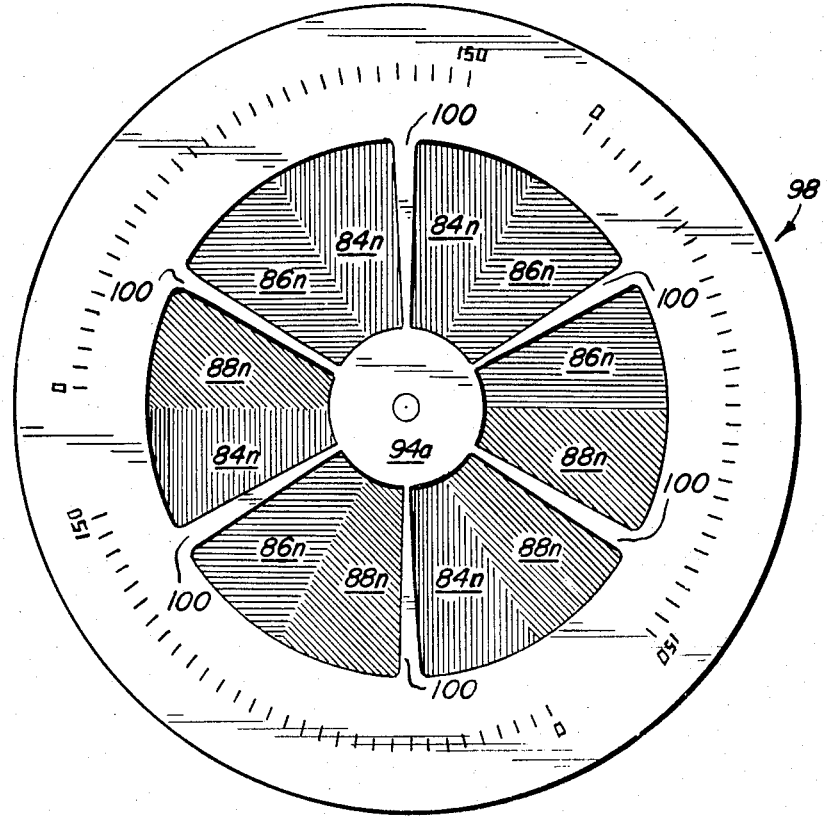
FIG. 7 is a plan view of a modified filter disc which may be employed in the filter assembly of FIG. 6.

FIG. 7 is illustrative of a modified color disc 98 employing six support blades 100 of approximately 5° in width extending from center 94a and reinforcing engaged color filter segments 84n, 86n and 88n each of which occupies about 27½° of the disc periphery. Such construction provides a sturdy filter disc construction and eliminates the necessity of employing the filter segments as a structural component holding the disc peripheral and center portions in a state of assembly.

Figure 8:
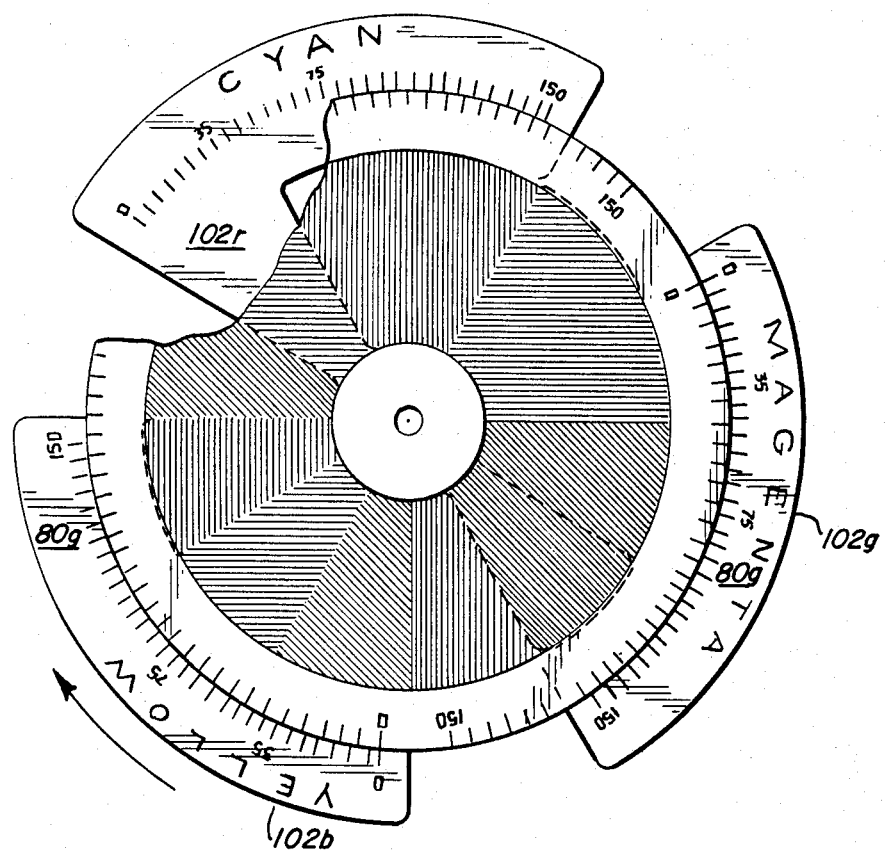
FIG. 8 is a plan view of a second modified color filter assembly similar to the color filter assembly of FIG. 6 but with the cover members thereof arranged beneath the filter disc which is broken away.
Figure 11:
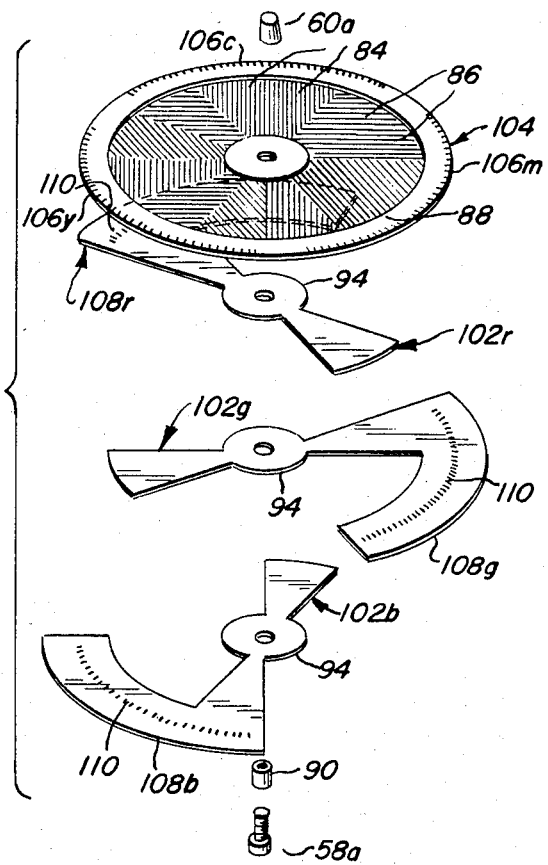
FIG. 11 is an exploded view of the components employed in the modified color filter assembly of FIG. 8.

Covers 102r, 102b and 102g of FIGS. 8 and 11 are employed in a filter disc-cover assembly modification in which the covers are not disposed on the upper surface of disc 104 but rather layered beneath the disc in the manner more clearly illustrated in FIG. 11.

In the assembly of FIGS. 8 and 11 any desired color correction may be obtained by appropriate cover disposition relative to the filter segment-bearing disc.

The layered cover members 102r, 102g and 102b are scythe-like in configuration so that curved blade portions 108r, 108g and 108b, respectively, extend beyond the outer periphery of the disc 104. Indicia 110 on the cover curved portions are disposed radially outwardly of adjacent indicia 106m, 106y and 106c so as to form scales indicating the magenta value provided by the position of the cover 102g, the cyan value provided by the position of the cover 102r and the yellow value provided by the position of cover 102b.

The remaining components of the assembly of FIG. 11 are the same as those illustrated in FIG. 10. The cover and disc assemblies of FIGS. 10 and 11 may be readily mounted on a needle-like bearing which engages the recessed bottom of bolt 58a whereafter the assembly may be spun by hand by means of the knurled nut 60a. As above noted the assembly of FIG. 11 differs from that of FIG. 10 inasmuch as the filter disc 104 is disposed uppermost with the covers arranged in layered relationship beneath the disc. It is also apparent that regardless of whether the covers are above or below the adjacent disc, they perform the function of preventing the passage of light beyond the disc. Stops which may comprise projections (not illustrated) formed on the peripheries of the discs 82 and 104 may be employed to prevent movement of the individual cover members beyond the 30° working range.

Figure 12:
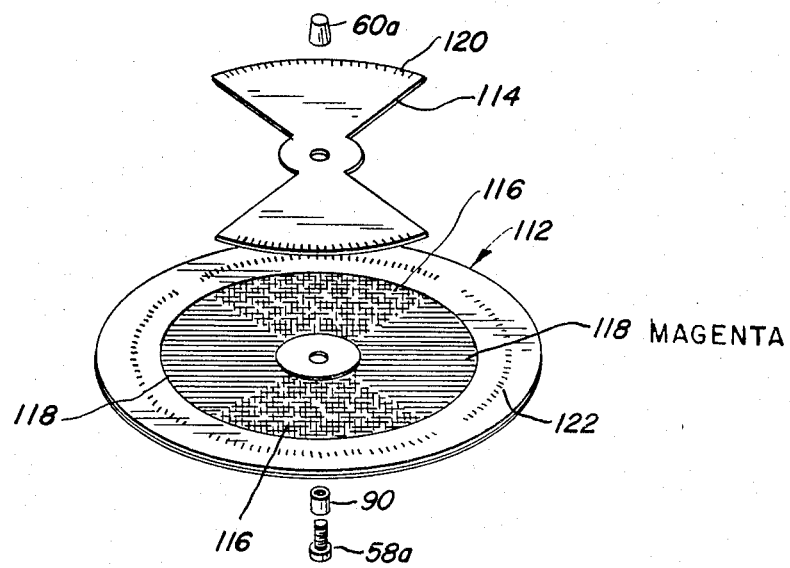
FIG. 12 is an exploded view of a filter assembly adapted for use with variable contrast photographic paper employed in black and white photography.

FIG. 12 is illustrative of a filter disc and cover assembly which is particularly adapted for use in forming prints from variable contrast black and white printing paper. Variable contrast printing paper is made with one or two emulsion coatings designed to produce different contrast when exposed to normal printing light through colored filters. Variable contrast paper eliminates the necessity of a printer stocking printing paper in a variety of grades to accommodate negatives of widely varying contrast. The filters employed are normally adapted to be used with negatives classified in one of four standard contrast grades. Obviously the employed filter may not be a perfect complement and may be off a fraction of a contrast grade so that the final print does not possess optimum contrast. Variable contrast printing paper for black and white printing is thus presently employed with a series of filters for purposes of providing the desired contrast correction for a specific graded negative, the assembly of FIG. 12 dispenses with any need for employing a series of filters employed in providing prints from negatives of various grades.

Thus, by employing a spinning filter disc 112 having two quadrants opposed to each other of "high contrast" filters spaced apart by two quadrants of "low contrast" filters and a cover which permits only two quadrants of the filter disc to be exposed at any one time, it is possible to project a negative through the spinning disc 112 so that either high contrast or low contrast or a mixture of both can be realized. All of the filter adjustments found in any set of filters employed with variable contrast paper may be substituted by the assembly of FIG. 12 which provides for infinite adjustments from one end of the contrast scale to the other.

The specific color of the filter quadrants employed in disc 112 is dependent upon the type of variable contrast printing paper used and the emulsions thereon. If Kodak Polycontrast printing paper is employed, segments 116 would be strong yellow and segments 118 would be strong magenta. The yellow filters would be employed with high contrast negatives whereas the magenta filters would be used with low contrast negatives.

The assembly of FIG. 12 could be employed to advantage with variable contrast printing paper when exposing substantially all black and white negatives, since each negative will normally always be off a contrast grade fraction requiring filter correction. The cover 114 of FIG. 12 need rotate only 90° to effect full adjustment from one end of the contrast range to the other. If such 90° movement does not allow simple calibration of the contrast grades to be provided by the filter disc 112, a vernier scale for reading the contrast grades indicated by the indicia 122 on the disc 112 may be employed. Such vernier may spread the contrast grade scale over 180° as by supplying the cover with an elongate curved portion bearing the indicia in the manner suggested in FIGS. 6, 8, 10 and 11. Since there are only four basic contrast grades, even quarter grade calibrations should be widely spaced on the 90° cover adjustment. The calibrations won't be linear and the four contrast grades can only be found and calibrated empirically.

I claim:

1. A filter assembly for modifying generally collimated light from a light source, said assembly comprising:
   generally planar base means having a central hub portion defining a rotational base bearing and apertured portions radially spaced from said hub portion and extending circumferentially relative to said hub portion,
   yoke support means comprising a first leg having a support bearing cooperating with said base bearing to rotatably support said base means and a second leg having mounting means to secure said assembly to said light source with the axis of said collimated light transversely intersecting said base radially outward from said hub,
   light filter means overlying at least some of said apertured portions, said apertured portions lying on a circumference of said base which intersects said axis,
   said filter means and said axis of collimated light intersecting at an acute angle,
   carrier means rotatably mounted on said base for rotation about said hub, said filter means being mounted on said carrier means,
   said base, said carrier and said filter means always being balanced about said rotational base bearing, and
   manually engageable means for rotating said base, said carrier and said filter means on said bearings with said apertured portions of said base and said filter means passing through said axis to provide a predetermined integrated effective filtered light output from said light source.

2. The filter assembly of claim 1, wherein said carrier means is rotatable between positions where said filter means overlies said apertured portions and a position where said filter means is aligned with unapertured portions of said base.

3. The filter assembly of claim 2 wherein said carrier means comprises two carriers independently rotatable about said hub and said filter means comprises a first filter of a first characteristic mounted on said first carrier and a second filter of a second characteristic mounted on said second carrier.

4. The filter assembly of claim 3 wherein said first filter is a yellow filter and said second filter is a magenta filter.

5. The filter assembly of claim 3 wherein said carrier means further comprises a third carrier independently rotatable about said hub and said filter means further comprises a third filter of a third characteristic mounted on said third carrier.

6. The filter assembly of claim 5 wherein said third filter is a cyan filter.

7. The filter assembly of claim 2 wherein said apertured portions comprise a plurality of sectors with opaque sectors of the base means therebetween, said filter means also comprising a plurality of sectors rotatable between a position aligned with said opaque sectors and a position aligned with said apertured sectors.

8. The filter assembly of claim 5 wherein said base means comprises a base disc and a cover disc, said discs having aligned apertured sectors therein and being secured in overlying spaced relationship with said carriers rotatably mounted therebetween.

9. The filter assembly of claim 8 wherein each of said carriers has a radially extending tab comprising an index which extends radially beyond said cover disc, said cover disc having calibrating indices thereon which cooperate with said index to indicate the integrated effective filtered light output provided when the respective carrier is rotated to a selected position.

10. The filter assembly of claim 5 wherein said filter means and said apertured portions comprise quadrantal sectors.

11. The filter assembly of claim 10 wherein filter material complementary to said filter means lies in the quadrantal sectors between said filter means.

12. The filter assembly of claim 1 wherein said acute angle is in the range of about 65° to about 75° to said axis and said first leg further including positioning means for transversely locating said base means relative to said axis.

13. A filter assembly for modifying generally collimated light from a light source, the assembly comprising
a planar filter carrier having a central portion defining a rotational bearing and having a plurality of planar colored light filter means radially extending from said central portion,
light impermeable cover means rotatably mounted to move relatively to at least some of said radiating light filter means of said filter carrier for purposes of preventing light from said light source engaging said cover means from passing beyond said filter carrier,
yoke support means comprising a first leg having a support bearing cooperating with said rotational bearing to rotatably support said carrier and a second leg having mounting means to secure said assembly to said light source with the axis of said collimated light transversely intersecting said filter means radially outward from said central portion,
said filter means and said axis of collimated light intersecting at an acute angle,
said carrier, said filter means and said cover means always being balanced about said rotational bearing, nad
manually engageable means for rotating said carrier, said filter means and said cover means on said bearings with said filter means and cover means passing through said collimated light axis to provide a predetermined integrated effective filtered light output from said light souce.

14. The filter assembly of claim 13 in which said colored filter means comprises segments of red, blue and green filters arranged about the carrier periphery and said cover means rotatably mounted at the carrier center and adapted to cover filter segments 180° apart, said segments being arrnaged to enable complementary colored segments to be simultaneously uncovered as opposed filter segments of one color are covered by said cover means.

15. The filter assembly of claim 14 in which each of said filter segments occupies approximately 30° of the carrier periphery and opposed segment pairs of each of the three colors are arranged at 30° intervals, each segment of each opposed segment pair of the same color having disposed counterclockwise thereof a filter disc segment of one of the other two colors; the two counterclockwise segments comprising the complement of color of the opposed segment pair of the same color.

16. The filter assembly of claim 13 in which said light filter means comprises alternating segments of high density yellow filter material and high density magenta filter material each of which occupies about 90° of the filter carrier periphery.

17. The filter assembly of claim 16 in which said cover means is adapted to cover opposed carrier segments of 90°.

18. The filter assembly of claim 13 in which each of said cover means has a curved portion extending radially beyond said carrier periphery, said curved portion having calibrating indicia thereon, said carrier periphery also having cooperating calibrating indicia thereon which with said cover portion indicia indicates the effective filtered light output provided when the filter carrier and cover assembly is rotated with the axis of said collimated light transversely intersecting said filter means radially outward from said central portion.

19. The filter assembly of claim 13 in which each of said cover means has a curved portion extending radially within said carrier periphery, said curved portion having calibrating indicia thereon, said carrier periphery also having cooperating calibrating indicia thereon which with said cover portion indicia indicates the effective filtered light output provided when the filter carrier and cover assembly is rotated with the axis of said collimated light transversely intersecting said filter means radially outward from said central portion.

20. A filter assembly for modifying generally collimated light from a light source, said assembly comprising:
generally planar base means having a central hub portion defining a rotational base bearing and apertured portions radially spaced from said hub portion and extending circumferentially relative to said hub portion,
yoke support means comprising a first leg having a support bearing cooperating with said base bearing to rotatably support said base means and a second leg having mounting means to secure said assembly to said light souce with the axis of said collimated light transversely intersecting said base radially outward from said hub,
light filter means overlying at least some of said apertured portions, said apertured portions lying on a circumference of said base which intersects said axis, carrier means rotatably mounted on said base for rotation about said hub, said filter means being mounted on said carrier means, and said carrier means being rotatable between positions where said filter means overlies said apertured portions and a position where said filter means is aligned with unapertured portions of said base, said filter means and said apertured portions comprising quadrantal sectors and filter material of neutral density corresponding to the effective density of said filter means lies in the quadrantal sectors between said filter means, said carrier means comprising at least two carriers independently rotatable about said hub, and said filter means comprising a first filter of a first characteristic mounted on said first carrier and a second filter of a second characteristic mounted on said second carrier, and manually engageable means for rotating said base on said bearings with said apertured portions passing through said axis to provide a predetermined integrated effective filtered light output from said light source.

* * * * *